(12) United States Patent
Frecska et al.

(10) Patent No.: US 7,425,108 B2
(45) Date of Patent: Sep. 16, 2008

(54) METHOD FOR MILLING SPLINES

(76) Inventors: Laszlo Frecska, 3308 Sherwood Forest Dr., Spring Grove, IL (US) 60069; James T. Hartford, 534 N. Fifth St., Silver Lake, WI (US) 53170

( * ) Notice: Subject to any disclaimer, the term of this patent is extended or adjusted under 35 U.S.C. 154(b) by 97 days.

(21) Appl. No.: 11/657,896

(22) Filed: Jan. 25, 2007

(65) Prior Publication Data
US 2007/0248427 A1  Oct. 25, 2007

Related U.S. Application Data

(60) Provisional application No. 60/793,820, filed on Apr. 21, 2006.

(51) Int. Cl.
*B23G 5/06* (2006.01)
*B26D 1/12* (2006.01)
(52) U.S. Cl. ............... 407/41; 407/49; 407/61; 407/63
(58) Field of Classification Search ........... 407/49, 407/25, 37, 38, 46, 41, 61, 63
See application file for complete search history.

(56) References Cited

U.S. PATENT DOCUMENTS

| | | | | |
|---|---|---|---|---|
| 3,915,059 A | * | 10/1975 | Pine | 409/36 |
| 4,034,646 A | * | 7/1977 | Dahlin | 409/76 |
| 4,323,325 A | * | 4/1982 | Samanta et al. | 409/131 |
| 4,884,427 A | * | 12/1989 | Sawahata et al. | 72/82 |
| 5,112,162 A | * | 5/1992 | Hartford et al. | 407/49 |
| 5,771,737 A | * | 6/1998 | Yaegashi | 72/370.19 |
| 5,908,071 A | * | 6/1999 | Hutchinson et al. | 166/55.6 |
| 6,033,157 A | * | 3/2000 | Satran et al. | 407/37 |
| 6,134,786 A | * | 10/2000 | Graupner et al. | 29/893.35 |
| 6,224,299 B1 | * | 5/2001 | Frecska et al. | 407/41 |
| 6,280,122 B1 | * | 8/2001 | Qvarth | 407/36 |
| 6,342,301 B1 | * | 1/2002 | Yoshida et al. | 428/408 |
| 6,499,917 B1 | * | 12/2002 | Parker et al. | 407/25 |
| 7,094,010 B2 | * | 8/2006 | Jonsson et al. | 409/66 |
| 7,118,311 B2 | * | 10/2006 | Astrom | 407/46 |
| 7,182,112 B2 | * | 2/2007 | Meados | 144/117.1 |

* cited by examiner

*Primary Examiner*—Willmon Fridie
(74) *Attorney, Agent, or Firm*—Leo J. Avbel

(57) ABSTRACT

A method of currently milling multiple splines on a round rod material. Inserts mountable on a milling machine are provided. The inserts each include two sets of milling teeth. The sets or sections of teeth are formed in the arc of a circle to enable milling multiple splines concurrently. The first set of teeth rough mills the grooves for the splines and the second set of teeth provides the finished milling.

2 Claims, 1 Drawing Sheet

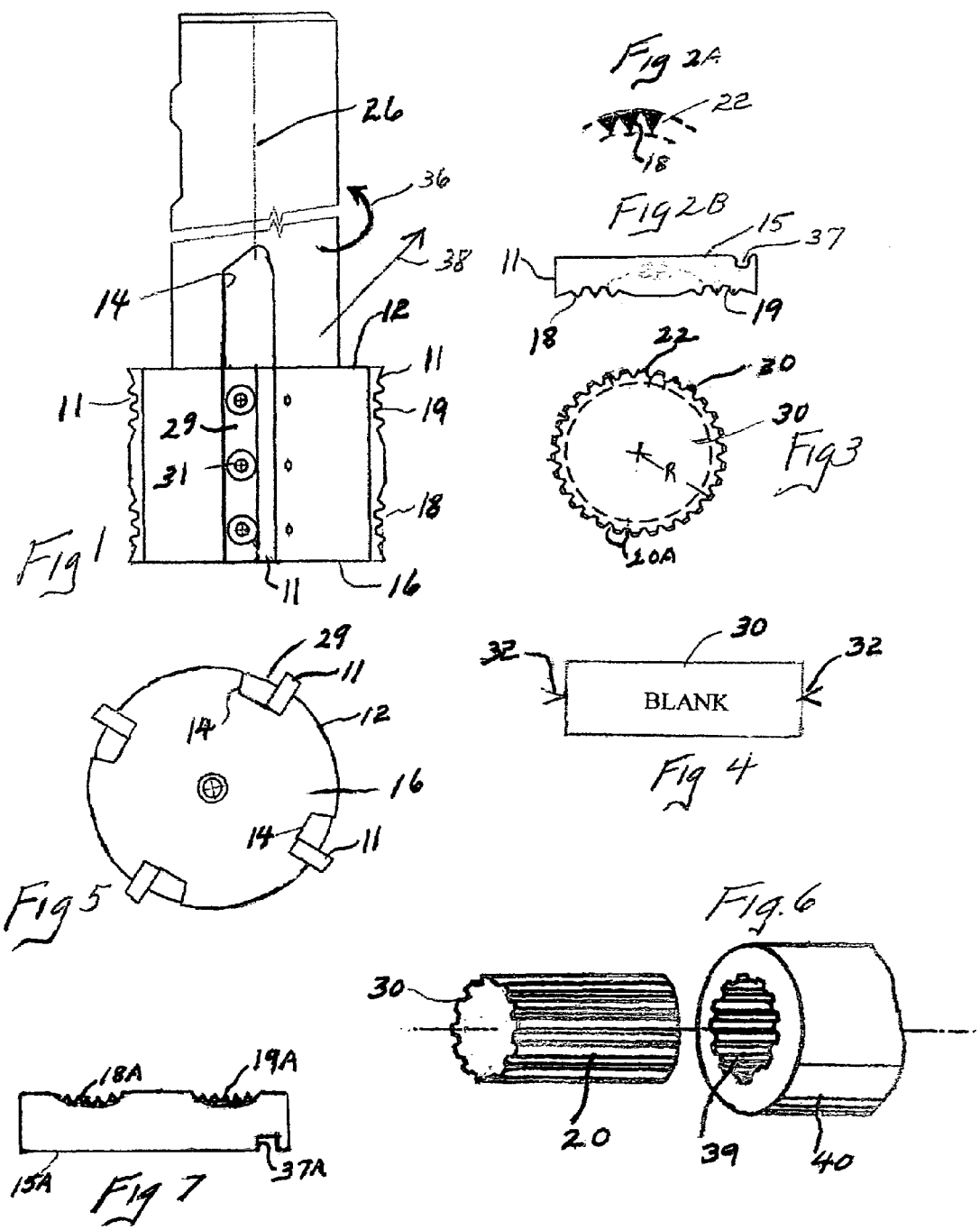

METHOD FOR MILLING SPLINES

BACKGROUND OF INVENTION

This application relates to a method of milling involute splines. This application claims the filing date of U.S. Provisional Patent Application Ser. No. 60/793,820 filed on Apr. 21, 2006 and titled "Replaceable Insert For Milling Splines" filed in the name of the same inventors herein. The present invention is of the general type disclosed in U.S. Pat. No. 5,112,162 tiled "Thread Mill Cutter Assembly" and issued to the same inventors hereof. Patent '162discloses replaceable inserts having a cutting body that is mounted in a recess formed on the shank of a tool holder. The inserts disclosed herein are also removable and replaceable on a tool holder.

SUMMARY OF INVENTION

The invention discloses a method of currently (at the same time) milling multiple splines on a round (rod) material. Replaceable inserts having teeth formed to have their cutting edges shaped in the arc of a circle are disclosed. The inserts are particularly useful for milling involute splines wherein the tool mills multiple splines concurrently. In use, inserts are mounted on the tool holder of a milling tool; the tool holder includes an elongated mounting recess for accommodating the inserts. The inserts each include two sets of cutting teeth; the first set of teeth rough mills the metal and the second set of teeth provides the finishing milling.

The foregoing features and advantages of the present invention will be apparent from the following more particular description of the invention. The accompanying drawings, listed herein below, are useful in explaining the invention.

DRAWINGS

FIG. 1 is a view of the inventive insert mounted on an associated thread milling tool;

FIG. 2A is an exaggerated view of the inventive insert to depict the teeth formed in the arc of a circle;

FIG. 2B is a side view of the inventive insert;

FIG. 3 is an end view of a rod having spines formed thereon as by the inventive method;

FIG. 4 depicts a blank rod that is to be milled being held in a position by a suitable spindle;

FIG. 5 is an end view of inserts mounted on the associated tool;

FIG. 6 is a view of a rod having involute splines formed on its circumference and an associated device with which it may be used; and FIG. 7 is a view of an insert for milling five (5) splines concurrently.

DESCRIPTION OF THE INVENTION

FIGS. 1 and 5 show the inventive inserts 11 mounted on an associated tool holder 12. The tool holder 12 may be generally similar to the type of tool holder disclosed in U.S. Pat. No. 6,457,381 issued to the same inventors hereof. Holder 12 is designed to receive and mount the inventive inserts 11 in respective recesses 14 formed on the free end of a standard type shank 16. Referring now also to FIG. 2B, inserts 11 are of carbide material and each insert comprises an essentially rectangular bar 15. In one embodiment the dimensions of the inserts are 1.5×0.20×0.40 inches.

FIG. 2B shows a side view of one of the inventive inserts 11, and FIG. 5 shows an end view of the inserts 11. The side of the inserts 11 abutting the bottom of the recess 14 may be slightly angled, not shown, to conform to the angled recess of the tool holder 12.

FIG. 2B shows the cutting projections or teeth 18 and 19 of insert 11. The teeth 18 and 19 are formed and arranged to mill the selected size and shape of splines 20, that is, the grooves 20A for the splines 20, see also FIGS. 3 and 6. Refer now to FIG. 2A that importantly depicts that the teeth 18 and 19 are formed to have their cutting edges or milling contour form the arc of a circle. As depicted in FIG. 3, each section or set of teeth 18 and 19 are formed to have a radius "R", and contour 22, similar to an arc of the circumference of the round rod material 30 being milled so as to mill multiple spline grooves 20A during the same operation. Said again, and as seen in both FIGS. 2A and 2B, the arc of a circle formed by the edges of teeth 18 and 19 is intended to match an arc of the circle of the material 30 (see FIG. 3) that is to be milled with involute splines 20. In the embodiment shown in FIG. 2B three (3) splines are milled currently by insert 15. In the embodiment shown in FIG. 7, five (5) splines can be milled concurrently by insert 15A that has five teeth in each section 18A and 19A.

To emphasis, each of the inserts 11 has the two sections (sets) 18 and 19 of milling teeth on opposite ends of a narrow side of the insert, see FIGS. 1 and 2B. The inserts 11 are mounted on tool holder 12 to have their teeth sections 18 at the end of the tool holder 12, and provide a first or rough milling of the grooves 20A for splines 20. The section 19 on the other end of insert 11 provides a second or finish milling to the spline grooves Referring now also to FIG. 5, thread milling inserts 11, for milling the splines 20 shown in FIG. 3 are mounted on the tool holder 12. The tool holder 12 includes elongated spaced recesses or slots 14 radially spaced on the tool holder 12 for receiving inserts 11 and associated securing wedges 29. The recesses 14 extend parallel to the longitudinal axis of the tool holder 12. The wedges are secured in position by suitable screws 31, see FIG. 1, that abut against and secure the inserts 11 in position in each respective recess 14. The teeth 18 and 19 (the cutting edges of the inserts 11) extend radially outwardly of the diameter of tool holder 12, see FIGS. 1 and 5.

As depicted in FIG. 4, the blank or rod 30 being milled to form the spindles is held in a stationary position by any well known type of spindle indicated at 32. The operating orientation of the rod 30 to tool holder 12 and inserts 11 relative to rod 30 is seen by noting the position rod 30 in FIG. 3 to tool holder 12 and inserts 11 in FIG. 1. Inserts 11 are positioned to be parallel to the longitudinal axis 26 of the tool holder 12 and transversely (perpendicular) to the longitudinal axis (marked with a + sign in FIG. 3) of rod 30 wherein the splines 20 are being milled. Accordingly, as tool holder 12 is fed to mill the material and rotated, as indicated by the arrow line 36, and moved parallel to the longitudinal axis of rod 30, as indicated by the arrow line 38, the inserts 11 rough mill a set of three splines or grooves 20 in rod 30 during each sub-operation. Next the rod 30 is repositioned or indexed, that is, turned a few degrees by spindle 32. The tool holder 12 is returned to an initial position and the process is repeated to rough mill a second set of three splines 20. The process is continuously repeated to mill three splines 20 at a time until the full complement of splines 20 on the circumference of the rod 30 are milled.

Next, the tool holder is lowered to position where teeth section 19 engages the rough milled spline grooves 20A to provide a finishing milling to the spline grooves. The section of teeth 19 provide a finishing milling to three grooves for splines 20 during each pass. As before, the process is repeated until the full complement of spline grooves get a finish milling.

Thus a first milling is made by the first section of teeth 18 to provide a rough milling of all the grooves for splines 20 for rod 30, three splines at a time. Next, the tool holder 12 is moved by the CAC (computer numerically controlled) machine and the inserts 11 are positioned such that the second section 19 can make the finish milling (of the spline groves just milled) of the spline's 20 in rod 30, three grooves at a time. The CAC machine is programmed to make the foregoing operation a continuous and repeated operation. The process is repeated until all the required involute splines 20 are formed on the outside diameter of the rod 30. As depicted in FIG. 6, the rod 30 may be used with the convolute splines 39 in an associated cylinder 40 and other types of units having conforming splines or gearing. Basically, the inventive method is directed to milling multiple involute splines concurrently.

Note that the sequence of steps outlined above may be varied by rough milling a first group of grooves for splines and then finish milling that first group, and then rough milling a second group and finish milling said second groups, etc. However, the essence of the invention remains the same; that is, the invention discloses a method for and associated inserts for, milling groups of splines concurrently.

The inventive method mills three splines concurrently and thus requires one third the rotary indexing steps of the rod blank material 30 as compared to the prior art. The inventive method requires one fifth of the indexing steps of the blank 30 as compared to the prior art when milling five splines at a time. Thus, the number of rotary indexing steps is minimized proportionally to the number of splines milled concurrently. It will be appreciated that indexing errors are minimized by the use of fewer indexing steps. It has been found that in a recent production run, the time for milling thirty-six (36) splines, in accordance with the present inventive method and using inserts 15 (FIG. 2B) with sections 18 and 19 of three teeth, required four (4) minutes time. This is in contrast to a time of one hour for the same milling project as required by prior art methods. Further the accuracy is as good or better than a hubbing (hobbing) or broaching machine. Also there is less stress on the material and longer tool life is expected than in a hubbing or broaching operation.

In the embodiment shown, a keying slot 37 is formed in each of the inserts 11 to engage a respective positioning shoulder in tool holder 12. For ease of assembly, the edges of the bar forming the insert 11 may have a slightly beveled top surface.

While the invention has been particularly shown and described with reference to preferred embodiments thereof, it will be understood by those skilled in the art that various changes in form and details may be made therein without departing from the spirit and scope of the invention.

The invention claimed is:

1. Inserts for a milling tool holder wherein said tool holder includes elongated recesses for receiving said inserts, said inserts each comprising
    a) an elongated rectangular bar having two sections of cutting teeth on one side of the bar for milling round material having a given radius;
    b) said two sections of teeth having their cutting edges formed in an arc of circle to match the radius of said material being milled, said two sections teeth being longitudinally spaced from one another;
    c) said tool holder positioning said first section of teeth to concurrently rough mill a plurality of longitudinal grooves on said material to form splines; and
    d) said tool holder next moving said tool holder for positioning said second section of teeth to concurrently finish mill to said material.

2. An elongated tool holder having replaceable cutting inserts for milling involute splines in circular rod material comprising,
    a) said tool holder including a shank having spaced elongated recesses for respectively receiving a plurality of cutting inserts on the periphery thereof, said recesses being parallel to the longitudinal axis of said shank;
    b) means for securing said inserts in said recesses;
    c) said inserts each comprising an elongated rectangular bar having cutting teeth sections forming arcs in the shape of the rod in which the spines are being milled;
    d) two sections of cutting teeth formed on each of said inserts;
    e) said two sections being longitudinally spaced from one another with the first section being operable to provide a rough mill on the rod and said second section being operable to provide a finish mill on the rod; and
    f) said sections of teeth each being formed in an arc of a radius forming or matching the arc of the rod to enable a group of splines to be milled at the same time.

\* \* \* \* \*

UNITED STATES PATENT AND TRADEMARK OFFICE
CERTIFICATE OF CORRECTION

PATENT NO.         : 7,425,108 B2
APPLICATION NO.    : 11/657896
DATED              : September 16, 2008
INVENTOR(S)        : Laszlo Frecska and James T. Hartford It is certified that error appears in the above-identified patent and that said Letters Patent is hereby corrected as shown below:

Col. 4 lines 23-25 in claim 1, clause d, first line, the first occurrence of "said tool holder" is hereby deleted.

Clause d of claim 1 should now read as follows:
        d) next moving said tool holder for positioning said second
            section of teeth to concurrently finish mill to said material.

Signed and Sealed this

Twenty-fourth Day of March, 2009

JOHN DOLL
*Acting Director of the United States Patent and Trademark Office*